United States Patent
Samofalov et al.

(10) Patent No.: US 7,492,550 B2
(45) Date of Patent: Feb. 17, 2009

(54) MAGNETIC RECORDING HEAD AND METHOD FOR HIGH COERCIVITY MEDIA, EMPLOYING CONCENTRATED STRAY MAGNETIC FIELDS

(75) Inventors: Vladimir Nikolaevich Samofalov, Kharkov (UA); Leonid Zakharovich Lub'yaniy, Kharkov (UA); Evgeniy Ivanovich Il'yashenko, Moscow (RU); Audun Ramstad, Oslo (NO)

(73) Assignee: Tandberg Storage ASA (NO)

( * ) Notice: Subject to any disclaimer, the term of this patent is extended or adjusted under 35 U.S.C. 154(b) by 789 days.

(21) Appl. No.: 10/715,635

(22) Filed: Nov. 18, 2003

(65) Prior Publication Data

US 2006/0187580 A1    Aug. 24, 2006

(51) Int. Cl.
G11B 5/127 (2006.01)
(52) U.S. Cl. ..................................................... 360/125
(58) Field of Classification Search ............... None
See application file for complete search history.

(56) References Cited

U.S. PATENT DOCUMENTS

| | | |
|---|---|---|
| 2,428,449 A | 10/1947 | Camras |
| 2,774,935 A | 12/1956 | Rademakers et al. |
| 4,649,449 A | 3/1987 | Sawada et al. |
| 4,656,547 A | 4/1987 | Kumasaka et al. |
| 4,682,256 A | 7/1987 | Ayabe |
| 4,953,048 A | 8/1990 | Kameyama et al. |
| 4,972,284 A | 11/1990 | Smith et al. |
| 4,987,508 A | 1/1991 | Smith |
| 5,121,274 A | 6/1992 | Matsumi |
| 5,416,410 A | 5/1995 | Kastler |
| 5,576,914 A * | 11/1996 | Rottmayer et al. .......... 360/324 |
| 5,883,763 A * | 3/1999 | Yuan et al. .................. 360/324 |
| 6,072,670 A | 6/2000 | Furuichi et al. |
| 2003/0111614 A1 | 6/2003 | Tanaka |

FOREIGN PATENT DOCUMENTS

| | | |
|---|---|---|
| DE | 38 21 284 A1 | 12/1989 |
| JP | 61-269204 | 11/1986 |
| JP | 04-167207 A * | 6/1992 |

OTHER PUBLICATIONS

"New Structured Planar Write Head for 100 Gb/in$^2$ and Beyond," Kanai et al., IEEE Trans. on Magnetics, vol. 38, No. 5, Sep. 2002, pp. 2210-2212.

"Design Optimization of Planar-Type Write Head for High-Density Magnetic Recording," Kim et al., IEEE Trans. on Magnetics, vol. 38, No. 5, Sep. 2002, pp. 2213-2215.

"Disk Recording Beyond 100 Gb/in.$^2$: Hybrid Recording? (Invited)," Ruigrok et al., J. of App. Physics, vol. 87, No. 9, May 1, 2000, pp. 5398-5403.

(Continued)

*Primary Examiner*—Mark Blouin
(74) *Attorney, Agent, or Firm*—Schiff Hardin LLP (57) ABSTRACT

In methods and arrangements for concentrating stray magnetic fields, a pair of permanent magnets is employed in combination with a magnetic flux circuit, the permanent magnets in the pair having respective magnetizations that are oriented oppositely to each other. The permanent magnets produce a stray magnetic field that adds to a magnetic field produced by the magnetic flux circuit.

8 Claims, 7 Drawing Sheets

OTHER PUBLICATIONS

"New Magnetic Recording Method Using Laser Assisted Read/Write Technologies," Katayama et al., Proc. of Magneto-Optical Recording Int. Symp. '99, J. Magn. Soc. Jpn., vol. 23, Supplement No. S1, (1991) pp. 233-236.

"High Density Thermomagnetic Recording on Flux Detectable RE-TM Media," Nemoto et al., Proc. of Magneto-Optical Recording Int. Symp. '99, J. Magn. Soc. Jpn., vol. 23, Supplement No. S1, (1991) pp. 229-232.

* cited by examiner

STRAY FIELD

*FIG. 1*

STRAY FIELD

MAGNETIC RECORDING HEAD AND METHOD FOR HIGH COERCIVITY MEDIA, EMPLOYING CONCENTRATED STRAY MAGNETIC FIELDS

BACKGROUND OF THE INVENTION

1. Field of the Invention

The present invention is directed to arrangements and methods suitable for use in magnetic recording, test and measurement equipment and other purposes, employing concentrated stray magnetic fields.

2. Description of the Prior Art

During recent years there has been a continuous drive towards higher storage capacity and correspondingly faster data transfer rates. For magnetic storage devices the path to higher storage density per area is through the development of media with increasingly smaller magnetic grains.

Attempting to merely scale down mechanical dimensions, however, results in operations closer to thermal instability of the magnetization, known as the "Superparamagnetic Limit".

Changing to grains made of materials that have higher crystalline magnetic anisotropy moves this limit. This suggests the use of higher magnetic coercivity materials, which are readily available. The challenge is to create a strong enough magnetic field with a high enough field gradient to write a high-density signal on such a medium.

Magnetic tapes and disks operate with longitudinal recording, which means that the written magnetic units are organized along the surface in the direction of the movement of the medium.

The write field must then be a stray magnetic field, which has a longitudinal component. The maximum achievable write field for a given pole geometry is limited by the saturation magnetization of the pole material. Advances over the past years in designing high moment pole materials seem to stagnate at a $B_s$ around 25 kG. Therefore tape with coercivity higher than about 3 kOe cannot be properly utilized. For hard disk drives the limit is somewhat higher, due to their higher linear density, thinner recording layer and shorter head to media spacing.

The magnetic field inside the gap itself can easily be made more than 10 times stronger, but to utilize that field the medium must be inside the gap. This is done by the so-called SPT, Single Pole Type head (also referred to as a monopole head). A "gap" is formed between the write pole and a high permeability soft magnetic under-layer (SUL) in the media that carries the flux back to the return pole of the head. Impeding the progress of this technology has been noise from the SUL.

For these reasons the strong increase in storage density per area for hard disks over the recent years has slowed down somewhat. This is a clear drawback in the ongoing competition with other storage technologies.

Much research is devoted to finding means of creating the very strong fields required for writing high coercivity media.

A planar type of write head with specific pole tip geometry for providing extremely strong magnetic fields has been suggested in K. S. Kim et al., IEEE Trans. Magn., Vol. 38, NO 5 September 2002, pp. 2213-2215 and Yasushi Kanai et al., IEEE Trans. Magn., Vol. 38, NO. 5 September 2002, pp. 2210-2212 The only available data on such designs to date are based on simulations. These show that a very high power is required; in excess of 0.4 ampere-turns to write on 8 kOe media. A further drawback of such designs is thought to be the manufacturability of the high quality write gaps needed.

Another suggested solution of this problem is heat, i.e. thermal (or optical) assistance to decrease the coercivity of the storage medium during the recording process. Several techniques have been suggested for this approach, namely Kryder M. N., Review of non-conventional recording: Approaches to 100 Gbit/in$^2$, The Magnetic Recording Conference, Minneapolis, Minn., 1993, Nemoto H. et al., J. Magn. Soc. Jpn., Vol. 23, Supplement No. S1, p. 229 (1999), Katayama H. et al., J. Magn. Soc. Jpn., Vol. 23, Supplement No. S1, p. 233 (1999) and Ruigrok, J. J. et al. J. Appl. Phys., 87, p. 5398 (2000). All these techniques have important disadvantages: The heating of adjacent tracks during the recording process, the requirement of a very sharp temperature gradient (especially with media with metallic substrates), as well as the use of two different kinds of energy sources for recording, adding complexity to the system.

SUMMARY OF THE INVENTION

An object of the present invention is to provide a magnetic write head that produces a high write field with a high gradient allowing a significant leap forward in media coercivity and linear density without increased power consumption. Some of the problems of the alternative technologies for high coercivity recording, e.g. heat assisted recording, are thus overcome.

An alternative to increasing the magnetic anisotropy of materials is to change from longitudinal to perpendicular recording media. If the obstacles in the path toward this technology are cleared, some increase in linear density is readily achieved. In any case higher coercivity materials are required, and for hard disk drives this will happen soon. Based upon this invention, heads for both longitudinal and perpendicular recording media can be made.

Magnetic field circuits having such properties are important for many other applications than magnetic storage, such as mechanical bearings, particle beam devices etc.

The invention can be used for magnetic recording on both flexible and solid media, like for instance floppy disks, hard disks (Winchester disks), tapes and any kind of magnetic cards.

Additional applications are in specific test and measurement equipment that relies on strong magnetic stray fields.

This invention relates to an arrangement that provides a stray magnetic field with a longitudinal or a perpendicular component of strength 10 kOe or more and having a very high gradient. The key element is the use of permanent magnets to increase the write field of the head. A preferred embodiment is a pair of anti-parallel permanent magnets located in the gap of an ordinary write head. The field from the permanent magnets acts as a bias field. An additional field, provided by a write current in a winding magnetically coupled to the permanent magnets, modulates the fringing field so as to achieve a field of strength high enough for writing the actual medium. Since a bias field is provided by permanent magnets, the required write current measured in ampere-turns is much lower than for conventional heads, or for heads as mentioned above. The magnets can be oriented so as to provide a dominating longitudinal field or a dominating perpendicular field.

Since one gap with one pair of magnets only can provide a field in one specific direction, the medium must be pre-magnetized in the opposite direction before writing the information. This pre-magnetization may be done by a second pair of similar magnets in a similar gap with similar write coils located very close to the first gap. A proper current pre-magnetizes the medium when passing this second gap before the actual information writing process in front of the first gap.

The write current waveform can be of any shape as long as the peak value is sufficiently high to provide a field that together with the bias field has strength enough for magnetizing the medium properly.

DESCRIPTION OF PREFERRED EMBODIMENTS

Figure 1:
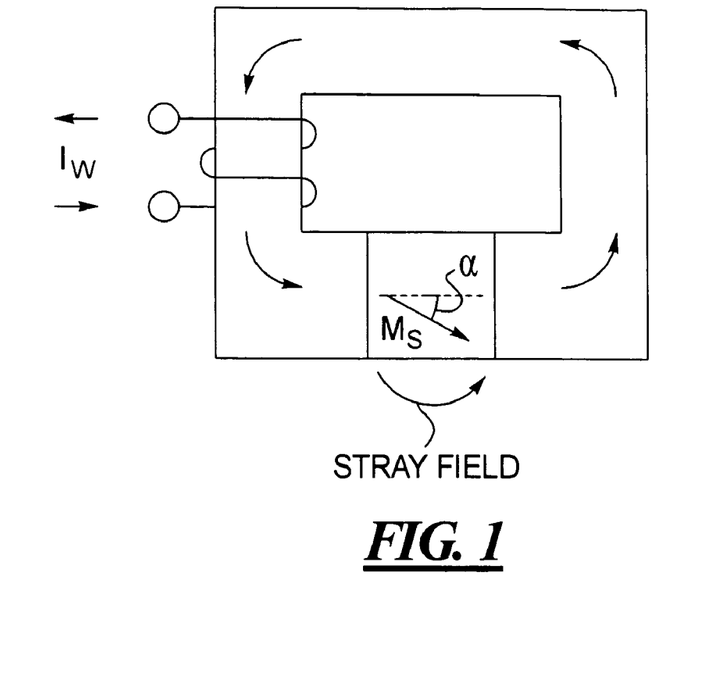
FIG. 1 illustrates the position of a single permanent magnet in the gap of a write head core. The magnetization vector of the magnet is at an angle α with the air-bearing surface (ABS).

FIG. 1 illustrates the simplest embodiment of a write head for longitudinal recording using a permanent magnet to boost the stray field. A single permanent magnet with a magnetization vector at an angle α with the ABS is placed in the gap of a conventional write head core. The angle α is chosen so as to obtain optimal recording properties, i.e. the strongest, highest gradient combined field from the permanent magnet and the soft magnetic circuit.

Figure 2:
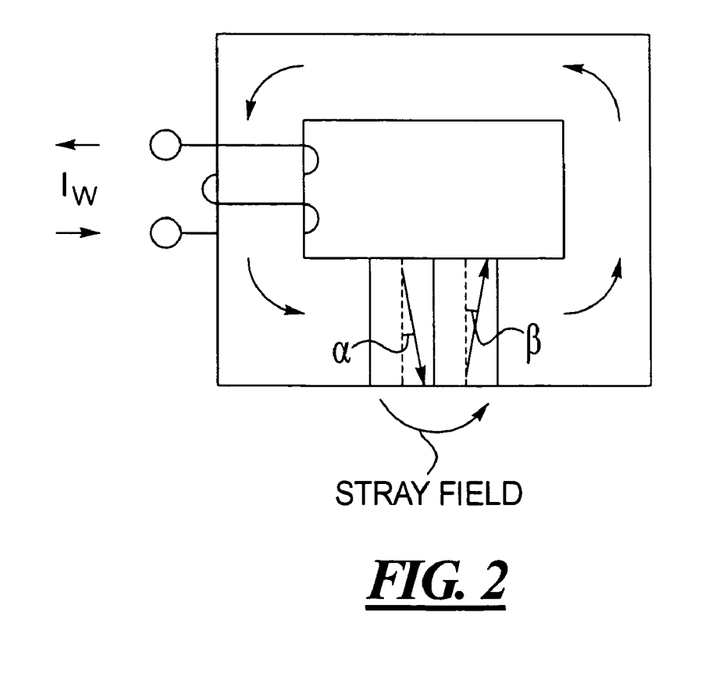
FIG. 2 illustrates the location of the magnets in the gap of a flux guide (yoke) of a write head in accordance with the invention. The magnetization vectors are at slight angles α and β with the ABS surface normal.

In accordance with the invention, a much stronger, higher gradient stray field can be obtained from a combination of two permanent magnets with essentially anti-parallel magnetization vectors. FIG. 2 shows in principle how the two magnets M1 and M2 are located in the gap of a traditional write head core. The directions of their magnetization and also the stray field out of the gap are shown with arrows. Also a write winding with write current Iw and the corresponding field in the core is depicted. This arrangement is for longitudinal recording. The orientation of the magnetization vectors of M1 and M2 is essentially anti-parallel, but possibly at slight angles α and β with the ABS surface normal. α and β are chosen to give optimal recording performance.

Figure 3:
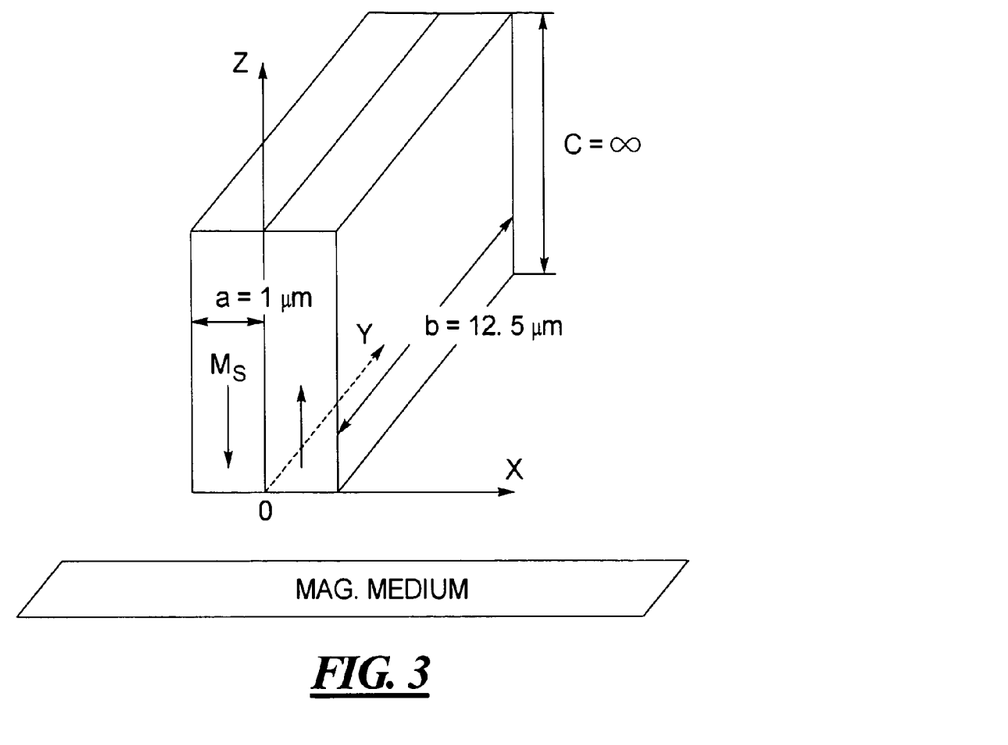
FIG. 3 illustrates the geometry and dimensions of the $SmCo_5$ permanent magnets used in the model calculation for explaining the invention.
Figure 4:
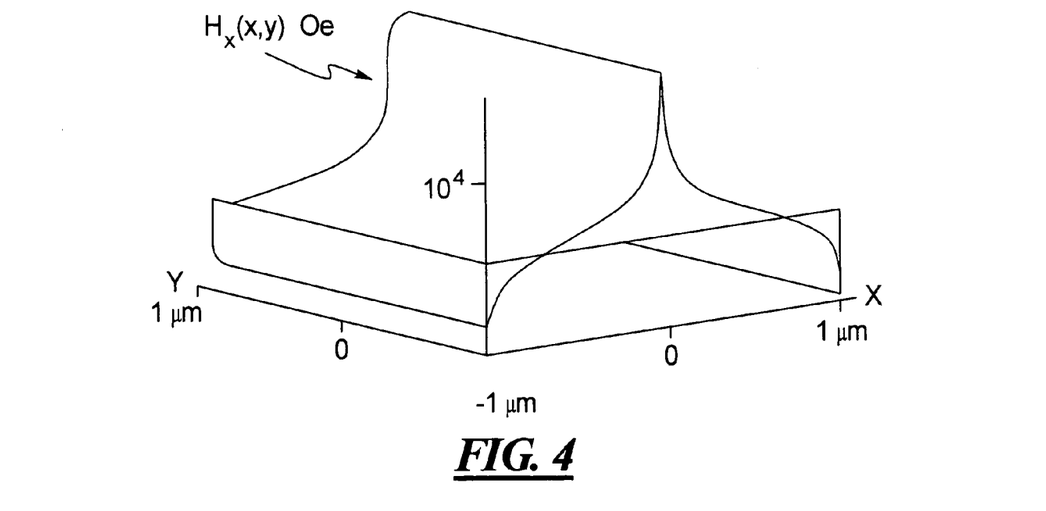
FIG. 4 illustrates the calculated longitudinal stray field component distribution and the xy-plane resulting from the permanent magnets shown in FIG. 3.
Figure 5:
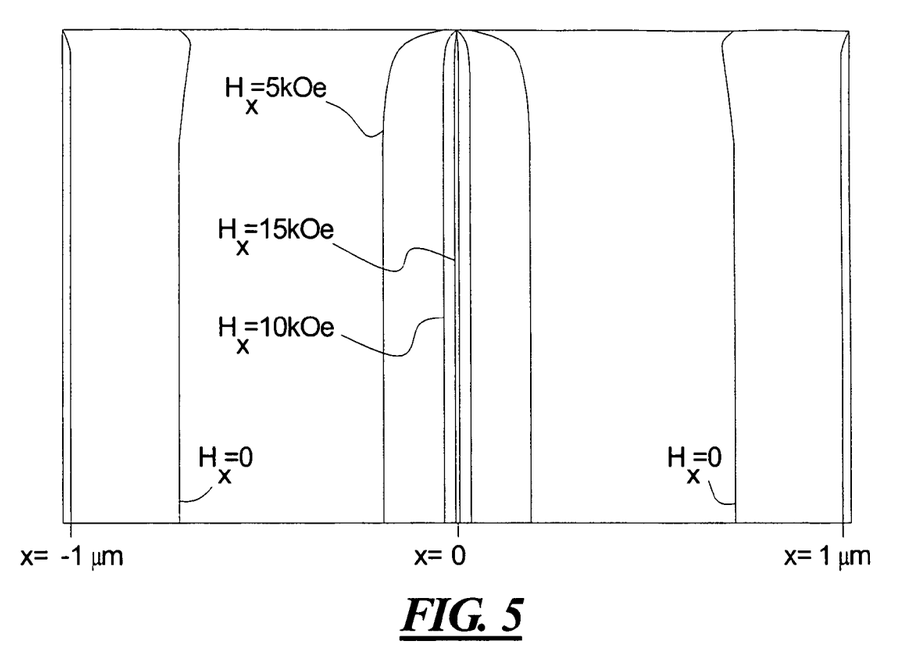
FIG. 5 illustrates the curves of constant Hx(x,y) at z=0 for the field distribution of FIG. 4, for $H_x(x,y)$=15, 10, 5 and 0 kOe.

To illustrate the strong, high gradient stray fields obtained with this arrangement of permanent magnets, some calculations have been made. FIG. 3 shows the simple geometry of two $SmCo_5$ permanent magnets used in the model calculation. FIG. 3 also defines the coordinate system used below in the description of the resulting stray field. As seen in FIG. 3, the calculation only includes the permanent magnets, not the soft magnetic circuit shown in FIG. 2. In FIG. 3 (and in FIG. 9D as well) it will be understood that the magnetic medium is schematically shown, and that in reality it has a width that significantly exceeds the width b. FIG. 4 shows the resulting distribution in the xy-plane of the longitudinal component $H_x(x,y)$ at a distance z=0 from the ABS of the head. FIG. 4 shows that the component $H_x$ reaches very high values, more than 10 kOe, at small values of x, between −0.1 μm and +0.1 μm, i.e. corresponding to ⅒ of the gap length in FIG. 1. These numbers are more easily seen in FIG. 5 that shows curves of equal stray field strengths $H_x$. To obtain such high fields, a sharp transition between the two magnetization orientations of the two permanent magnets is essential. A permanent magnet material with a very high anisotropy, such as $SmCo_5$ must be used. FIG. 4 and FIG. 5 also show that the y-dependence of $H_x$ is constant along nearly the entire length b, i.e. the track width, until it drops abruptly to zero. This is an important characteristic for a precisely defined written track width.

Figure 6:
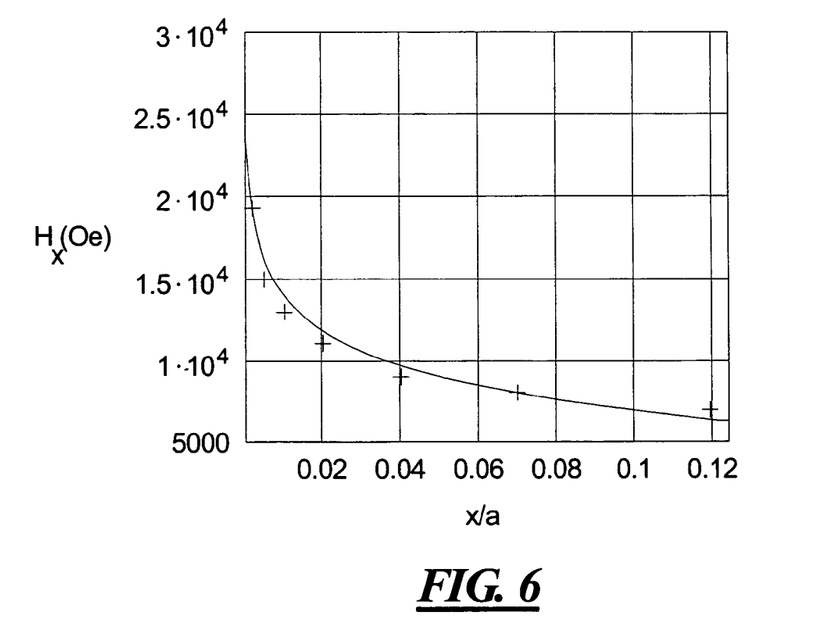
FIG. 6 illustrates the dependence of the longitudinal component $H_x$ of the stray magnetic field along the x-axis at z=110 μm, with y at any position where the edge effects are negligible.

For experimental confirmation of the calculated results, a large-scale model consisting of two 40 mm×40 mm×10 mm $SmCo_5$ parallelepipeds was made. The measured stray field from this model is compared with the theoretical results in FIG. 6. The crosses show experimental data and the curve shows the theoretical results. The experimental data shows that the longitudinal field is approximately 20 kOe for x=20 μm and z=110 μm. This value is approximately two times $4\pi M_s$ for this permanent magnet material.

The write element shown in FIG. 2 can magnetize the recording medium only in one direction. In order to create magnetic transitions, the medium must be pre-magnetized in the opposite direction. A single element writer may thus only be used for applications where the medium is pre-magnetized and the medium is only to be written once.

For applications where over writing data is required and where the medium only moves in one direction relative to the head during writing, the pre-magnetization may be done by an arrangement of permanent magnets such as shown in FIG. 3. The material in the pre-magnetizing pair of magnets is chosen such that the stray field is strong enough to magnetize the medium without assistance from a soft magnetic circuit.

Figure 7:
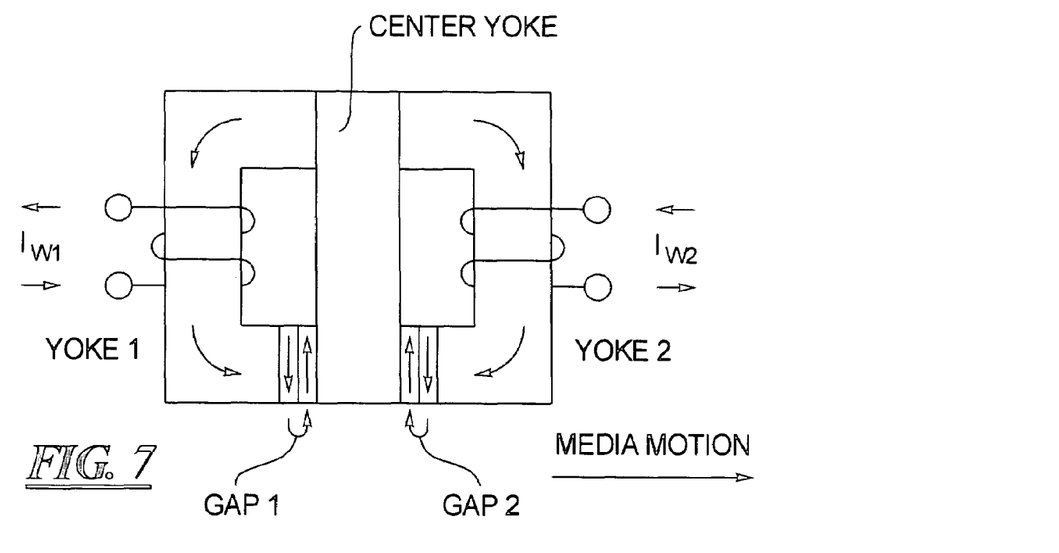
FIG. 7 illustrates an arrangement of a complete write head for bi-directional recording and DC pre-magnetization of the recording medium, in accordance with the invention.

For applications where the medium moves in two directions relative to the head during writing, a combination of two write elements of the type shown in FIG. 2 may be used. FIG. 7 illustrates a complete write head, having two gaps, one for pre-magnetizing and one for writing the information. When the medium moves in the direction indicated in FIG. 7, Gap 1 does the pre-magnetization. Then $I_{W1}$ may be a DC current or a pulsed DC current with constant duty cycle. The actual information is written with Gap 2, according to the information-coded DC current $I_{W2}$. When the medium moves in the opposite direction, $I_{W2}$ and Gap 2 take care of the pre-magnetization while $I_{W1}$ and Gap 1 write the information. The center yoke may need to be magnetically divided to avoid coupling between the fields from the currents $I_{W1}$ and $I_{W2}$.

Figure 8:
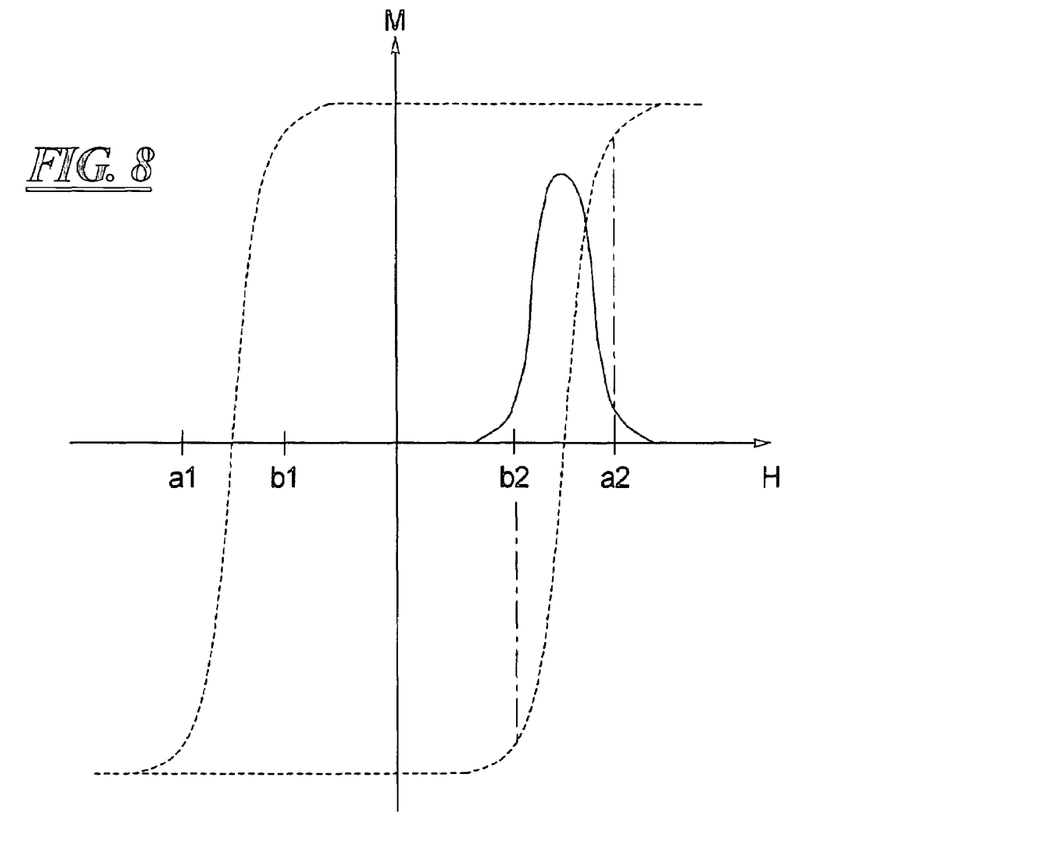
FIG. 8 illustrates the hysteresis loop and switching field distribution for a recording medium.

FIG. 8 shows a hysteresis loop and the corresponding switching field distribution (SFD) for a recording medium. As measured with the field from a write head, the width of this distribution results from a combination of the distribution of grain coercivity and the depth dependence of the longitudinal stray field, $H_x(z)$, i.e. a stronger head field is required to switch a grain of a given coercivity near the bottom of the recording layer than near the top. Between the field levels b1 and b2, only an insignificant amount of grains are affected by the head field; the signal decay caused by the head passing over prewritten media is at an acceptable level. The levels b1 and b2 are thus the appropriate bias field levels supplied by the permanent magnets. At the levels a1 and a2 most of the grains are switched. These are the write levels. The soft magnetic part of the write element (the coil) supplies the difference, e.g. a1-b1. For the bi-directional write head of FIG. 6, the field level a1 for pre-magnetization of the medium is a result of the magnets in Gap 1 and the write current $I_{W1}$, saturating the medium in one direction. The field level b2 is achieved by the magnets in Gap 2. The write current $I_{W2}$ brings the field up to the level a2 according to the data pattern, and magnetizes the medium close to saturation. During read operations there are no write currents in the windings, and only the field levels b1 and b2 from the permanent magnets are present.

For applications where a strong bias field may not be permitted due to the danger of erasing data during read back, i.e. b1 and b2 are close to zero (e.g. in media with a wide SFD or where the magnetic layer is thick relative to the head media spacing), the field from the permanent magnets may be fully or partially cancelled by an opposing field from the coil. In the case of complete cancellation, a current +I would be applied through the coil turns during writing and –I would be applied when the writer is inactive. The current I is set so that the field inside the medium from the coil is identical in size to the field from the permanent magnets. The current I is thus approximately half the current required by a coil with an air gap to produce the same field strength. With the bidirectional design (see FIG. 7) two such coils are required, the total current will thus be the same as for a conventional writer, but the total field strength in the medium (and thus the maximum allowed medium coercivity) will be increased by nearly a factor of 2. If a finite bias field may be permitted without risk of erasure, the increase in field strength will be even greater.

Figure 9A:
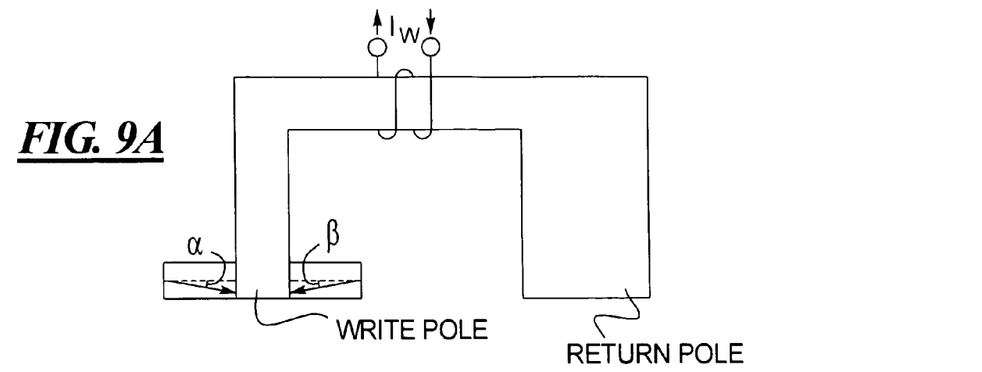
FIG. 9A illustrates an SPT head with a permanent magnet on each side of the write pole along the down track direction. The magnetization vectors of the two magnets are essentially anti-parallel, but at slight angles α and β with the ABS.
Figure 9B:
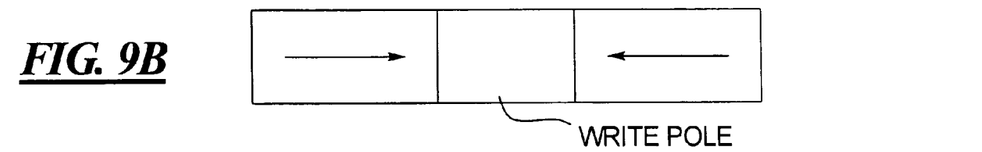
FIG. 9B shows an ABS view of the write head of FIG. 9A.
Figure 9C:
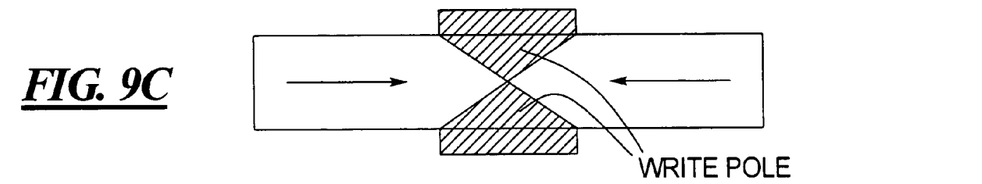
FIG. 9C shows an ABS view of an SPT head with permanent magnets wedged into the write pole.

Although a significant advantage of the present invention is the extension of the realm of longitudinal recording, it is clear that perpendicular recording would also benefit from the ability to focus magnetic fields and to save power. Arrangements of magnets and write coil for a perpendicular recording head are shown in FIGS. 9A through 9D. FIG. 9A illustrates a conventional SPT head with one permanent magnet on each side, along the down-track direction, of the write pole. The magnetization vectors of the two magnets are essentially anti-parallel, but at slight angles α and β with the ABS for optimizing recording properties. FIG. 9B shows the write pole and the permanent magnets looking down on the ABS. FIG. 9C illustrates, from the same perspective as FIG. 9B, how the permanent magnets can be wedged into the write pole. This decreases the effective distance between the permanent magnets, increasing the field strength and gradient while increasing the overlap of the field from the permanent magnets with that of the soft magnetic circuit.

It will be understood that FIGS. 9A through 9D illustrate simply the principal, and that different embodiments with differing detailed geometries can achieve the same result.

Figure 9D:
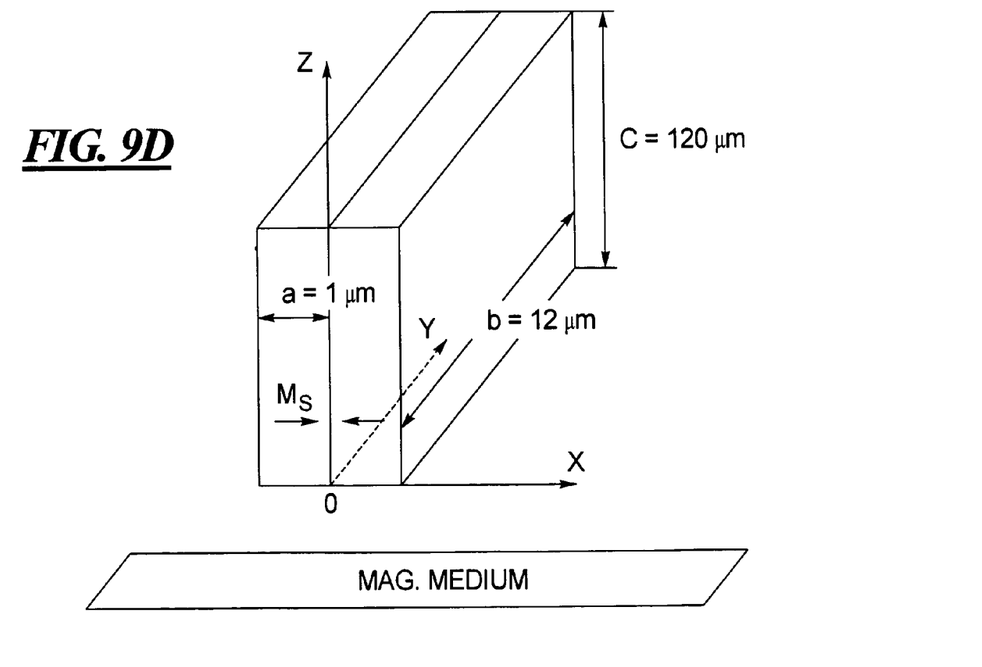
FIG. 9D illustrates an exemplary embodiment of a permanent magnet arrangement in accordance with the invention, with exemplary dimensions.
Figure 10:
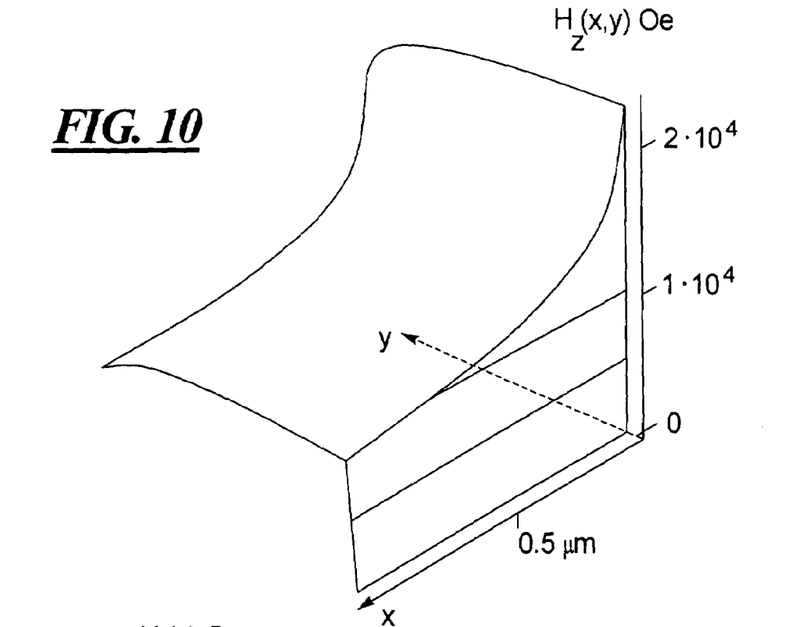
FIG. 10 illustrates the calculation results for $H_z(x,y)$ for the geometry of the permanent magnets shown in FIG. 9D.
Figure 11:
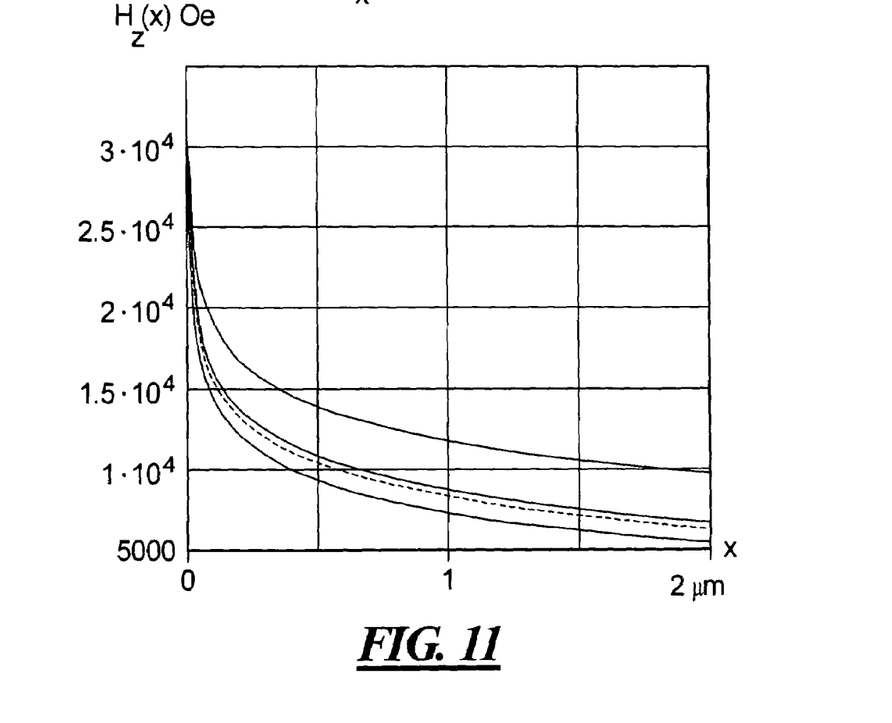
FIG. 11 illustrates the perpendicular stray field at component $H_z(x)$ for different values of y (i.e., different cross-sections of the surface shown in FIG. 10).

Calculation results for $H_z(x,y)$ for the geometry of $SmCo_5$ permanent magnets shown in FIG. 9D are shown in FIG. 10. FIG. 10 shows $H_z(x,y)$ in the region 0 μm<x<1.0 μm, 0 μm<y<12.0 μm, with $M_S$=750 G. Cross sections of this surface at different values of y are shown in FIG. 11. In FIG. 11, the uppermost curve is calculated for an infinitely long gap (b=∞) yielding the simple form $H_z(x)=4\ \pi M_s \ln(c/x)$ with c=120 μm. The next curve below the uppermost curve is for y=1 μm, the dotted curve is for y=5 μm, and the curve below the dotted curve is for y=10 μm. The calculations predict that in a narrow region, –0.1 μm<x<+0.1 μm, i.e. a/5, the perpendicular stray filed component $H_z$ is more than twice $4\ \pi M_s$ for this permanent magnet material. It is also noted that there is only a weak y-dependence, that is in the track width direction.

Figure 12A:
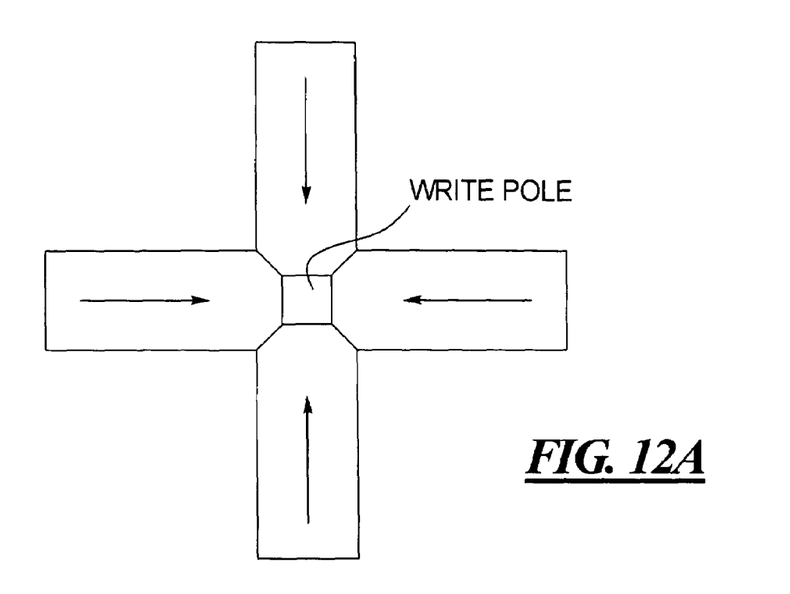
FIG. 12A illustrates an ABS view of a write pole surrounded by four permanent magnets. The magnetization vectors all point towards the write pole.
Figure 12B:
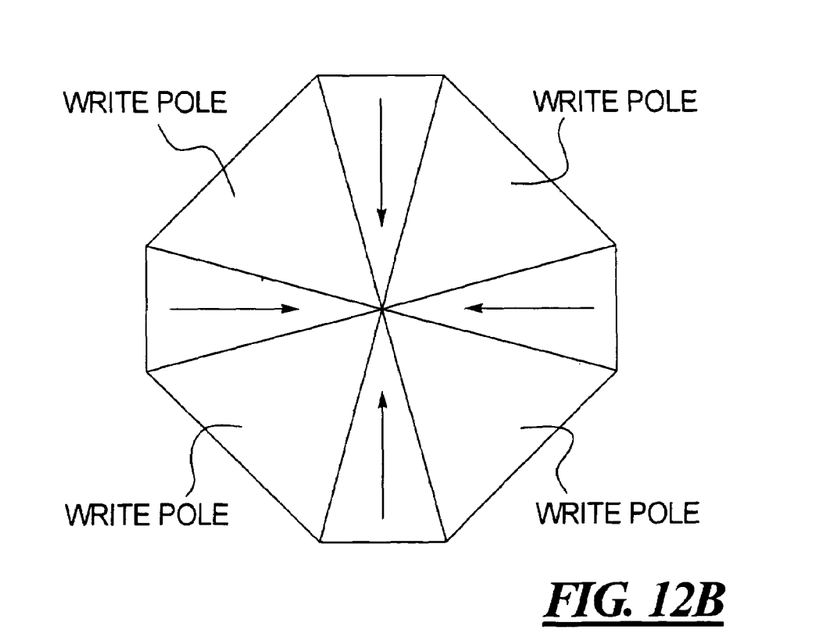
FIG. 12B illustrates an ABS view of four permanent magnets wedged into the write pole of a SPT head.

The use of permanent magnets in write heads for perpendicular recording also allows focusing the field in the cross track direction. This is important for recording very narrow tracks, i.e. square bits or point shaped bits e.g. with patterned media. FIGS. 12A and 12B illustrates in principal how the tip of the write pole of an SPT head could be modified by four permanent magnets to focus the field both in the down track and cross track direction. In FIG. 12A the write pole is in the center with four permanent magnets surrounding it. The arrows indicate the projection of the magnetization vectors in the ABS plane, which all point towards the write pole. Permanent magnets opposite each other have essentially anti-parallel magnetization vectors, but as in FIGS. 1, 2 and 9A-9C the vectors may be at different angles with the ABS. In FIG. 12B the permanent magnets are wedged into the write pole, converging at the center. This will increase the field strength and gradient and the overlap between the fields from the permanent magnets and soft magnets. In principal, any number of permanent magnets could be used in constructions similar to those of FIGS. 12A and 12B. The basic principal is to have permanent magnets with magnetization vectors projected on the ABS that are essentially radial to the center of the write pole and in sum equal to zero.

Although modifications and changes may be suggested by those skilled in the art, it is the intention of the inventors to embody within the patent warranted hereon all changes and modifications as reasonably and properly come within the scope of their contribution to the art.

We claim as our invention:

1. A write head for unidirectional overwriting on a medium magnetizable in a longitudinal direction, said medium having a surface and moving in a single medium movement direction, said write head comprising:

an inductive write element supplied with a current modulated with information to produce a basic magnetic field that embodies said information, said inductive write element having a gap therein;

a first magnet pair of two permanent magnets disposed in said gap with respective magnetization comprising magnetization components perpendicular to the surface of the recording medium of said two permanent magnets in said first pair that are oriented oppositely to each other, said first magnet pair producing a first stray magnetic field and the two permanent magnets thereof being composed of permanent magnetic material selected so that a sum of said first stray magnetic field and said basic magnetic field is sufficient to longitudinally magnetize said recording medium only when said inductive write element is supplied with a predetermined current, and to produce substantially no erasure in said recording medium when said write element is supplied with no current or a current that is negative compared to said predetermined current; and a second magnet pair of two permanent magnets disposed upstream of said inductive write element relative to said direction of medium movement, with respective magnetizations of said two permanent magnets in said second magnet pair comprising magnetization components that are oriented oppositely to each other in a direction perpendicular to the surface of the recording medium, with the respective magnetizations of said two permanent magnets in said second magnet pair being oriented oppositely to the respective magnetizations of said two permanent magnets in said first magnet pair, said second magnet pair producing a second stray magnetic field having a strength sufficient to longitudinally magnetize said recording medium for recording said information on said recording medium.

2. A write head as claimed in claim 1 comprising a spacer disposed between said permanent magnets in each magnet pair, each spacer being comprised of spacer material and having a thickness, and wherein each of the permanent magnets is comprised of permanent magnet material, and wherein, in each magnet pair, the spacer thickness and material and the permanent magnet material are selected to produce the opposite orientation of the respective magnetizations of the permanent magnets in that magnet pair by an anti-ferromagnetic exchange coupling between the permanent magnets in that magnet pair.

3. A write head for bi-directional overwriting in a longitudinally magnetized recording layer of a recording medium having a surface, comprising:

a first inductive write element supplied with a current modulated with information to produce a first basic magnetic field embodying said information, said first inductive write element having a gap therein, and a first magnet pair of two permanent magnets disposed in said gap of said first inductive write element with respective magnetizations having components perpendicular to the surface of the recording medium of the magnetization vectors of vectors of said two permanent magnets in said first magnet pair that are oriented oppositely to each other, said two permanent magnets in said first pair producing a first stray magnetic field, with a sum of said first basic magnetic field and said first stray magnetic field forming a first write field for recording on said recording medium;

a second inductive write element, disposed next to said first inductive write element, supplied with said current to produce a second basic magnetic field embodying said information, said second inductive write element having a gap therein, and a second magnet pair of two permanent magnets disposed in said gap of said second write element with respective components perpendicular to the surface of the recording medium of the magnetization vectors of said two permanent magnets in said second magnet pair oriented oppositely to each other, said second magnet pair producing a second stray magnetic field, with a sum of said second basic magnetic field and said second stray magnetic field forming a second write field for recording said information on said recording medium; and the respective magnetizations of the two permanent magnets of the first magnet pair being oriented oppositely to the respective magnetizations of the two permanent magnets of the second magnet pair.

4. A write head as claimed in claim 3 comprising a spacer disposed between said permanent magnets in each magnet pair, each spacer being comprised of spacer material and having a thickness, and wherein each of the permanent magnets is comprised of permanent magnet material, and wherein, in each magnet pair, the spacer thickness and material and the permanent magnet material are selected to produce the opposite orientation of the respective magnetizations of the permanent magnets in that magnet pair by an anti-ferromagnetic exchange coupling between the permanent magnets in that magnet pair.

5. A write head for bi-directional overwriting of a perpendicularly magnetized recording layer of a recording medium moving in a medium movement direction, comprising:

a first single pole write element having a write pole, said first single pole write element being composed of soft magnetic material and being supplied with current modulated with information to produce a basic magnetic field, embodying said information, diverging from the tip of said write pole, and a first magnet pair of two permanent magnets respectively disposed on opposite sides, along said medium movement direction, of said write pole with respective magnetizations comprising magnetization components parallel to said medium movement direction of the magnetization vectors of the two permanent magnets in said first magnet pair that are oriented oppositely to each other, said permanent magnets producing a stray magnetic field, with a sum of said basic magnetic field and said stray magnetic field forming a write field for perpendicular recording of said information on said recording medium;

a second single pole write element having a write pole disposed next to said first single pole write element, said second single pole write element being comprised of soft magnetic material and being supplied with said current to produce a basic magnetic field, embodying said information, diverging from the tip of said write pole, and a second magnet pair of two permanent magnets respectively disposed on opposite sides along said medium movement direction, of said write pole of said second single pole write element, with respective components parallel to said medium movement direction of the magnetization vectors of the two permanent magnets in said second magnet pair oriented oppositely to each other, said permanent magnets producing a stray magnetic field, with a sum of said basic magnetic field and said stray magnetic field forming a write field for perpendicular recording of said information on said recording medium; and the respective magnetizations of the two permanent magnets in said first magnet pair being oriented oppositely to the respective magnetizations of the two permanent magnets in said second magnet pair.

6. A write head for point recording on a pre-magnetized, moving medium, said medium having a medium movement direction, a surface and a recording layer that is pre-magnetized with a perpendicular pre-magnetization vector in a direction perpendicular to the surface of said medium, said write head comprising:

a single pole write element having a write pole with a center, said write element being comprised of soft magnetic material and being supplied with current modulated with information to produce a basic magnetic field, embodying said information, diverging from the tip of said write pole; and a multitude of wedge shaped permanent magnets sectioned into the soft magnetic material, converging at the center of said write pole, with respective magnetization vectors of said permanent magnets comprising magnetization components in a plane parallel with the surface of said medium that are essentially radial to the center of said write pole and in sum essentially equal to zero to produce a stray field in a direction opposite to the direction of said perpendicular pre-magnetization vector, with a sum of said basic magnetic field and said stray magnetic field forming a write field for perpendicular recording of said information on said recording medium.

7. A write head for unidirectional point overwriting on a moving medium, said medium having a surface and a recording layer, said medium moving in a single medium movement direction, said write head comprising:

a single pole write element having a write pole, said write element being composed of soft magnet material, and being supplied with current modulated with information to produce a basic magnetic field embodying said information;

a first multitude of wedge shaped permanent magnets sectioned into the soft magnetic material, converging at the center of said write pole with respective magnetization vectors of said permanent magnets having components in a plane parallel with the surface of said medium that are essentially radial to the center of said write pole and in sum essentially equal to zero, said first multitude of permanent magnets producing a first stray magnetic field and the permanent magnets thereof being composed of permanent magnetic material selected so that a combination of said basic magnetic field and said first stray magnetic field perpendicularly magnetizes said recording layer with a strength sufficient for recording said information on said recording medium only for a predetermined current supplied to said write element, and so that substantially no erasure in said recording layer occurs when said write element is supplied with no current or a current that is negative relative to said predetermined current; and a second multitude of permanent magnets disposed preceding said write element relative to said medium movement direction, the permanent magnets in said second multitude of permanent magnets having respective magnetization vectors of said permanent magnets having components in a plane parallel with the surface of said medium that are essentially radial to the center of said second multitude of permanent magnets and in sum essentially equal to zero, and the respective magnetizations of the permanent magnets in said second multitude being oriented oppositely to the respective magnetizations of the permanent magnets in said first multitude, said second multitude producing a second stray magnetic field and the permanent magnets thereof being composed of permanent magnetic material selected so that said second stray field has a strength sufficient to perpendicularly magnetize said recording layer in said recording medium for recording said information on said recording medium.

8. A write head for bi-directional point overwriting of a perpendicularly magnetized recording layer of a recording medium moving in a medium movement direction, comprising:

a first single pole write element having a write pole, said first single pole write element being composed of soft magnetic material and being supplied with current modulated with information to produce a basic magnetic field, embodying said information, diverging from the tip of said write pole, and a first multitude of wedge shaped permanent magnets sectioned into the soft magnetic material, converging at the center of said write pole with respective magnetization vectors of said permanent magnets having components in a plane parallel with the surface of said medium that are essentially radial to the center of said write pole and in sum essentially equal to zero, said permanent magnets producing a stray magnetic field, with a sum of said basic magnetic field and said stray magnetic field forming a write field for perpendicular recording said information on said recording medium;

a second single pole write element having a write pole, said second single pole write element being composed of soft magnetic material and being supplied with said current to produce a basic magnetic field, embodying said information, diverging from the tip of said write pole, and a second multitude of wedge shaped permanent magnets sectioned into the soft magnetic material, converging at the center of said write pole with respective magnetization vectors of said permanent magnets having components in a plane parallel with the surface of said medium that are essentially radial to the center of said write pole and in sum essentially equal to zero, said permanent magnets producing a stray magnetic field, with a sum of said basic magnetic field and said stray magnetic field forming a write field for perpendicular recording said information on said recording medium; and the respective magnetizations of the permanent magnets in said first multitude of permanent magnets being oriented oppositely to the respective magnetizations of the permanent magnets in said second multitude of permanent magnets.

* * * * *